United States Patent [19]
Elliott et al.

[11] Patent Number: 6,061,782
[45] Date of Patent: May 9, 2000

[54] MECHANISM FOR FLOATING POINT TO INTEGER CONVERSION WITH RGB BIAS MULTIPLY

[75] Inventors: Timothy A. Elliott; G. Glenn Henry, both of Austin, Tex.

[73] Assignee: IP First LLC, Fremont, Calif.

[21] Appl. No.: 09/048,712

[22] Filed: Mar. 26, 1998

Related U.S. Application Data

[63] Continuation-in-part of application No. 08/980,481, Nov. 29, 1997.

[51] Int. Cl.[7] .................................................. G06F 7/38
[52] U.S. Cl. ............................................................. 712/222
[58] Field of Search .............................. 712/222; 345/431

[56] References Cited

U.S. PATENT DOCUMENTS 5,257,215  10/1993  Poon .
5,734,874  3/1998  Van Hook et al. ..................... 712/222
5,856,829  1/1999  Gray, III et al. ....................... 345/422
5,878,266  3/1999  Goddard et al. ........................ 712/23

*Primary Examiner*—William M. Treat
*Attorney, Agent, or Firm*—James W. Huffman

[57] ABSTRACT

An apparatus and method for performing a floating point multiply (by a fixed graphics constant), and converting the product of the multiply into an integer, within a single operation is provided. The apparatus includes detection logic to determine whether a special multiply/convert operation is specified, and if so, floating point conversion logic to adjust a bias constant prior to conversion of the floating point number to an integer. More specifically, if the multiply/convert operation specified relates to calculation of graphic points for display, execution of the multiply convert operation effectively multiplies a specified floating point number by a graphics constant, as part of subtracting the exponent bias.

32 Claims, 4 Drawing Sheets

Formats for Numerical Data

| NAME | LENGTH (BITS) | RANGE | ENCODING | | |
|---|---|---|---|---|---|
| BINARY INTEGERS: | | | | | |
| word integer | 16 | $10^4$ | positives as binary integers negatives in two's complement ↓ | | |
| short integer | 32 | $10^9$ | | | |
| long integer | 64 | $10^{18}$ | | | |
| BINARY REAL NUMBERS: | | | sign bits | exponent bits | significand bits |
| single precision | 32 | $10^{\pm 38}$ | 1 | 8 | 23 |
| double precision | 64 | $10^{\pm 308}$ | 1 | 11 | 52 |
| extended precision | 80 | $10^{\pm 4932}$ | 1 | 15 | 64 |

MECHANISM FOR FLOATING POINT TO INTEGER CONVERSION WITH RGB BIAS MULTIPLY

CROSS REFERENCE TO RELATED APPLICATION

This application is a continuation-in-part of U.S. patent application Ser. No. 08/980,481 (Docket IDT:1395), filed Nov. 29, 1997 and entitled "INSTRUCTION SET FOR BIDIRECTIONAL CONVERSION AND TRANSFER OF INTEGER AND FLOATING POINT DATA."

BACKGROUND OF THE INVENTION

1. Field of the Invention

This invention relates in general to the field of microprocessors, and more particularly to a method and apparatus for converting and transferring data between floating point and integer registers within the context of calculating RGB values for graphic points.

2. Description of the Related Art

In general, modern computer systems treat numerical data as either integer data or floating point data depending on the application, the size of the number required by the application, and the type of operation to be performed on the data. Because of the difference in data formats between integer data and floating point data, microprocessors typically have two separate processing units, one for processing integer data (the Integer Unit, or IU), the other for processing floating point data (the Floating Point Unit, or FPU). Integer data is operated on by the integer unit within a microprocessor, while floating point data is operated on by the floating point unit within a microprocessor.

Frequently, data is shared by both an integer unit and a floating point unit. When data is shared, it must first be converted into an acceptable form, depending on whether it will be operated upon by the integer unit or the floating point unit. Conversion of data into an acceptable form is typically accomplished as a single operation that converts the data, from integer to floating point, or from floating point to integer, and then stores the converted data into memory.

Thus, before an integer unit can operate on data that is in a floating point unit, the data must first be converted into integer format, and then stored to memory. Alternatively, before a floating point unit can operate on data that is in an integer unit, the data must first be converted into floating point format, and then stored to memory. In modern microprocessors, requiring data to be converted, stored to memory, and then retrieved from memory, is very time consuming for the microprocessor, and adds significant delay in processing the data.

One context in which this is particularly true is in the processing of graphical points to be presented on a computer display. At present, every graphical point on a computer display has various attributes that must be calculated, many times each second. Among these attributes are the relative intensities of Red, Blue and Green (RGB). Typically, each attribute exists as a floating point number in the range of 0–1, signifying intensity of the RGB attribute. However, before the attribute is used to display a graphical point, it is multiplied by 256, and then converted into an integer. The integer, in the range of 0–255, is then provided to a video controller for display. Thus, for each attribute of each graphical point, a floating point multiply is required, followed by a conversion of the product into an integer, storage of the integer to memory, and subsequent loading of the integer into the integer unit of the microprocessor. The floating point multiply, followed by the integer conversion for each graphic point is very time consuming for the microprocessor.

Therefore, what is needed is an apparatus and method that unifies the floating point multiply, and the subsequent integer conversion, into a single operation, and that performs that operation faster than has heretofore been possible.

SUMMARY

To address the above-detailed deficiencies, it is an object of the present invention to provide a method and apparatus for converting a floating point number into an integer, and simultaneously performing a floating point multiply to convert the floating point number into a graphics point.

Accordingly, in the attainment of the aforementioned object, it is a feature of the present invention to provide a microprocessor for calculating Red, Green and Blue (RGB) graphic points for display. The microprocessor includes a floating point unit and a floating point convert/multiply instruction. The floating point unit receives a floating point number to be multiplied by a graphics constant, and converted into a graphics integer. The floating point number contains an exponent and a significand. The floating point convert/multiply instruction is executed by the floating point unit, and instructs the floating point unit to adjust a bias constant, associated with converting the floating point number to the graphics integer, prior to the conversion of the floating point number, the bias constant adjusted according to the graphics constant. By adjusting the bias constant according to the graphics constant prior to conversion of the floating point number to the graphics integer, an RGB graphics point is provided by the microprocessor without requiring a separate floating point multiply.

An advantage of the present invention is that a separate multiply instruction, prior to floating point to integer conversion, has been eliminated for those operations requiring graphic point calculations.

In another aspect, it is a feature of the present invention to provide a floating point unit within a microprocessor, to receive a convert/multiply instruction that multiplies a floating point number by a graphics constant, and converts a result into a graphics integer, both within a single operation. The floating point unit includes a floating point register file, convert/multiply detection logic, and floating point conversion logic. The floating point register file stores the floating point number which has an exponent and a significand. The convert/multiply detection logic is coupled to the floating point register file and determines whether a convert to integer instruction is of a type requiring an adjustment to a bias constant. The floating point conversion logic is coupled to both the floating point register file and the convert/multiply detection logic, to subtract the bias constant from the exponent before shifting the significand during execution of the convert to integer instruction, and to subtract a graphics constant from the bias constant, prior to subtraction from the exponent if the convert/multiply detection logic determines that the convert to integer instruction is of a type requiring adjustment.

An advantage of the present invention is that graphic points can be calculated and converted into graphics integers, within a single operation, faster than has heretofore been provided.

In yet another aspect, it is a feature of the present invention to provide a method for performing a graphics multiply on a floating point number, and for converting the floating point number into a graphics integer. The method includes: a) detecting whether a floating point to integer conversion instruction is executing; b) within a), detecting whether the conversion instruction specifies an adjustment to a bias constant; c) if a floating point to integer conversion instruction specifies an adjustment to a bias constant, adjusting the bias constant prior to subtracting the adjusted bias constant from the exponent field of the floating point number; and d) shifting the significand of the floating point number according to the result of the exponent subtraction.

An advantage of the present invention is that adjusting the bias constant associated with the exponent, prior to conversion of a floating point number into an integer, effectively performs a graphics multiply as part of a normal conversion process.

BRIEF DESCRIPTION OF THE DRAWINGS

These and other objects, features, and advantages of the present invention will become better understood with regard to the following description, and accompanying drawings where.

DETAILED DESCRIPTION

Figure 1:
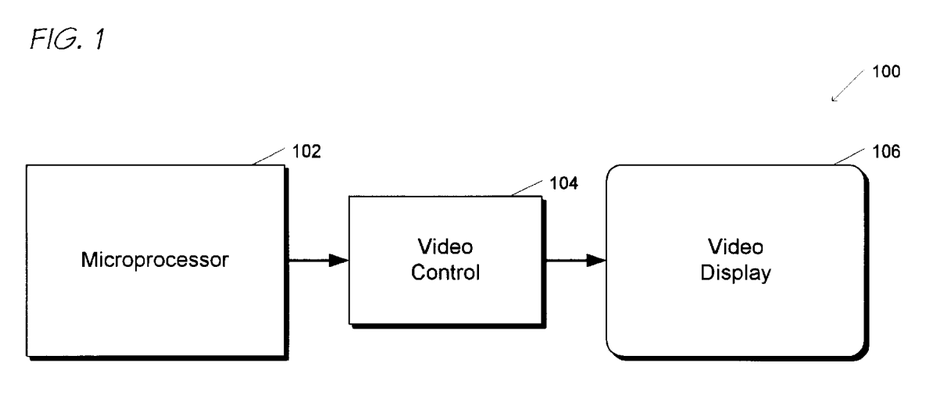
FIG. 1 is a block diagram of a computer system illustrating display of processed data to a video display.

Referring to FIG. 1, a computer system 100 is shown. The computer system 100 includes a microprocessor 102 coupled to video control logic 104, which in turn is coupled to a video display 106. In operation, the microprocessor 102 processes data for presentation on the video display 106, and provides the processed data to the video control logic 104. One skilled in the art will appreciate that processing of data for display requires the data to be multiplied within a floating point unit (not shown) within the microprocessor 102, and later converted into integer data before it can be provided to the video control logic 104 for display. Multiplication of data within a floating point unit, and later conversion of the floating point data into integer data will be further described below. First, however, a brief overview will be provided of data formats for both integer data and floating point data.

Figure 2:
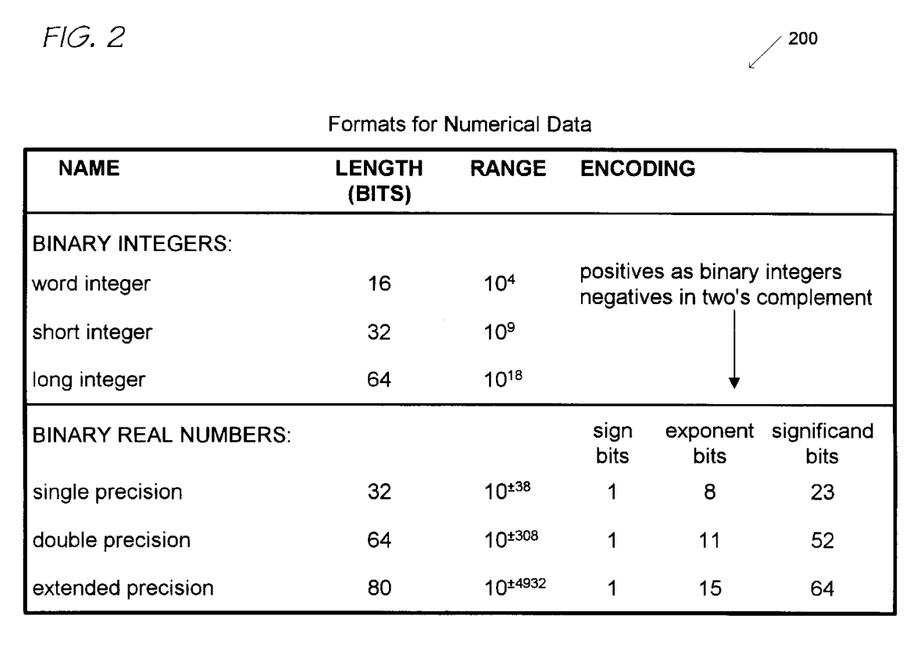
FIG. 2 is a table illustrating floating point data formats for numerical data.

Referring to FIG. 2, a table 200 is provided that illustrates common formats for numerical data within a microprocessor system. The table is divided into two parts, one associated with Binary Integers, the other associated with Binary Real Numbers.

Integer numbers are typically stored in one of three formats that have identical structure but different capacity. The word integer format occupies two bytes (16-bits), the short integer format takes up a double word (32-bits), and the long integer format a quadword (64-bits). In all three formats the most significant bit encodes the sign of the number. Generally, a sign bit of 1 represents a negative number and a sign bit of 0 a positive number. Positive numbers are stored in pure binary form. Negative numbers are represented as two's complement form.

The term Real Number, on the other hand, is typically used to designate a number than can be represented in signed, floating point form. Table 200 shows three floating point encodings for binary real numbers. Also, referring briefly to FIG. 3, block diagrams are shown particularly illustrating register formats for a floating point register 302 and an integer register 310. All three real number formats have the following fields: a sign bit field 304, an exponent field 306, and a significand field 308. The sign bit field 304, which is the most significant bit in the encoding, represents the sign of the number. A 1-bit in the sign field indicates a negative number and a 0-bit indicates a positive number.

Figure 3:
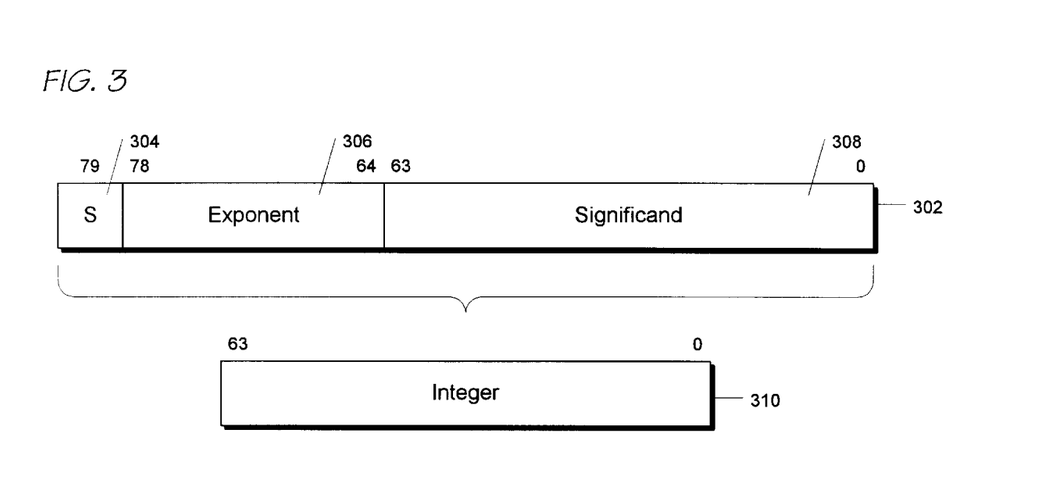
FIG. 3 is a block diagram of a portion of a microprocessor that transfers data between floating point and integer register files via memory.

The exponent field 306 encodes the position of the significand's binary point. The exponent encoding is in bias form. Therefore, if the absolute value of the exponent is less than the bias, then the exponent is negative. This eliminates the need to store the sign of the exponent. An exponent smaller than the bias is in the negative range. An exponent larger than the bias is in the positive range. The exponent is zero if it is equal to the bias. For example, given a 15-bit exponent, the largest value that can be stored is 7FFF. Thus, to allow both positive and negative exponents, a value of 7FFF/2, or 3FFF has been selected as a center point, or bias for storing exponents. For example, when storing a floating point number, a bias of 3FFF is added to the exponent before placing it into an exponent field 306 associated with the floating point number. And, when determining the actual value of a floating point number, the bias of 3FFF is first subtracted from the exponent to determine the "real" value of the floating point number.

The significand field 308 encodes the number's significant digits as a binary fraction. Normal numbers have an exponent in the range of 11..10 to 00..01 and the significand is a binary fraction in the form 1.xx..xx. The number of digits in the fractional part of the significand changes in the different formats. The integer digit of the significand is implicit in the single and double precision formats but is explicitly coded in the extended precision format.

In general, binary integers are operated on by an integer unit within a microprocessor and binary real numbers are operated on by a floating point unit. The integer unit may store data in its integer register file in any of the three integer formats shown in table 200. However, the floating point unit, even though it reads and writes data in any of the three real number formats, always stores data within its floating point register file, in 80-bit extended precision format. Numbers encoded in the remaining formats, typically exist only in memory. Thus, when a number is loaded from memory into a floating point register file, it is automatically converted into the extended precision format.

Figure 4:
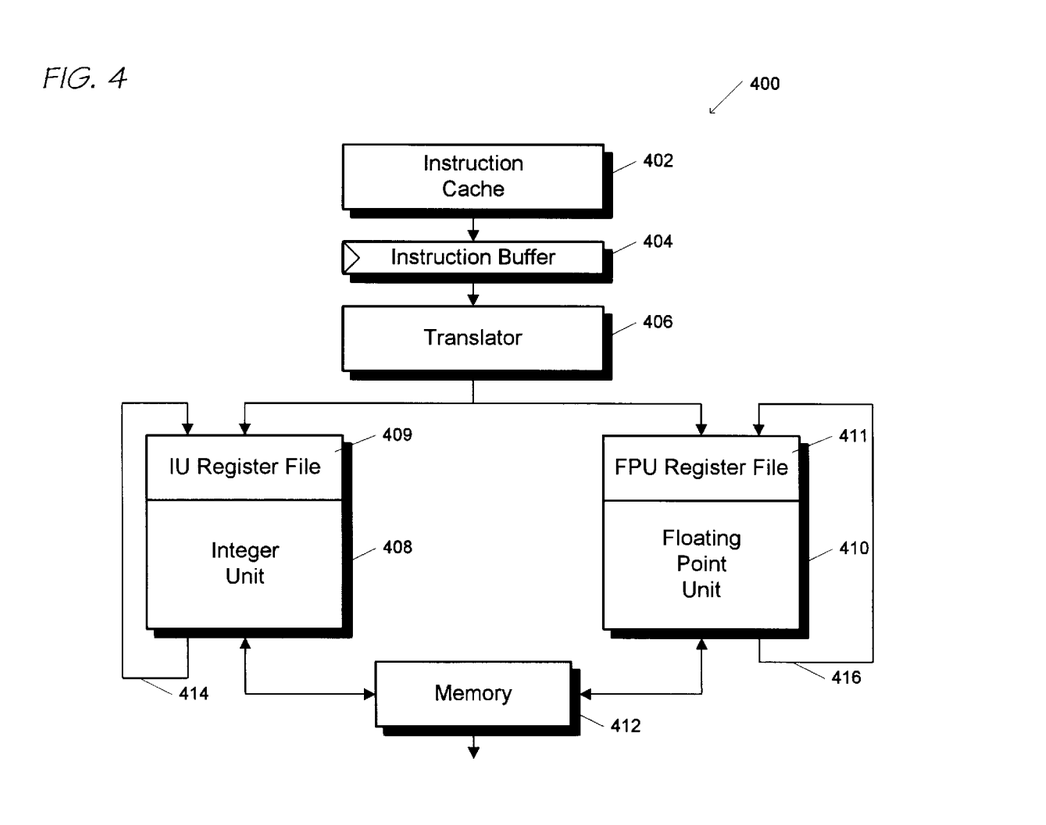
FIG. 4 is a block diagram of a floating point register and an integer register.

With the above overview of numeric formats within computer systems, a more detailed description of the problem to which the present invention is directed will be provided with reference to FIG. 4.

FIG. 4 contains a portion of a pipeline microprocessor 400. The microprocessor 400 contains an instruction cache 402 for temporarily storing instructions to be executed by the microprocessor. The instructions stored by the instruction cache 402 can be either integer instructions, or floating point instructions. During a first stage of the microprocessor 400, an instruction is fetched from the instruction cache 402 and provided to an instruction buffer 404. The instruction buffer 404 provides temporary storage for one or more instructions that are to be translated and executed by following stages in the pipeline.

The instruction buffer 404 provides instructions, to a translator 406 during a translate stage of the pipeline. The translator 406 translates, or decodes, the integer or floating point instructions into micro operations that can be executed by either an integer unit 408 or a floating point unit 410. If the translated instructions operate on integer data, they are provided to the integer unit 408. If the translated instructions operate on floating point data, they are provided to the floating point unit 410.

During the Register stage of the pipeline, either the integer unit 408 or the floating point unit 410 retrieves data specified by translated instructions from the IU register file 409 or the FPU register file 411, respectively. The numeric data in the IU register file 409 is stored in 16, 32 or 64-bit integer format. The data stored in the FPU register file 411 is stored in 80-bit extended precision format. The specified data is retrieved from the appropriate register file and is provided to the IU 408 or the FPU 410 for operation. The result of the operation is either stored back into the IU register file 409, via bus 414, or the FPU register file 411, via bus 416, or is written into memory 412. One skilled in the art will appreciate that although portions of the memory 412 may be cached within the microprocessor 400, the memory 412 indicated is external to the microprocessor 400. Thus, when either the IU 408 or the FPU 410 needs to write data to, or read data from the memory 412, the microprocessor 400 delays processing until the memory 412 can respond.

In the prior art, if data resides in the FPU register file 411 (in extended precision format), and it is needed by the integer unit 408, a programmer is required to first execute an instruction that converts the data in the FPU register file 411 into the desired integer format, and then stores the converted data into the memory 412.

Within an x86 microprocessor, the instruction that performs this conversion/move operation is the FIST instruction. The FIST instruction converts the value stored in a floating point register ST into a signed integer according to the rounding control specified in a floating point control word. The FIST instruction then transfers the result to a memory destination in the memory 412 that is specified by the instruction. The FIST instruction, within the Pentium microprocessor manufactured by Intel Corporation, requires 6 clock cycles to perform the conversion and transfer. After the data is stored into the memory 412, if it is desired by the integer unit 408, it is then retrieved from the memory 412. An instruction that performs the retrieval is the MOV instruction. The MOV instruction retrieves the converted data and stores it into the IU register file 409. As mentioned above, the process of storing the converted data into the memory 412, and then retrieving the data from the memory 412 adds significant delay in processing the data. In the case of the Pentium microprocessor, at least 7 clock cycles are required to convert and move a single datum from the FPU register file 411 to the IU register file 409.

Alternatively, if the FPU 410 requires data that is in the IU register file 409, a programmer must first execute an instruction that moves the integer data from the IU register file 409 to the memory 412. This instruction is the MOV instruction, and typically requires a single clock cycle. The programmer must then execute an instruction that retrieves the data from the memory 412, and converts the data to the correct floating point format, before storing the data into the FPU register file 411. An instruction for performing the retrieval and conversion is FILD. This instruction converts the source operand in the memory 412 into extended precision floating point format, and pushes it into the FPU register file 411. The FILD instruction typically requires 3 clock cycles. So, if the FPU register file 411 requires a single datum from the IU register file 409, at least 4 clock cycles are required.

Both of the above scenarios presume that the microprocessor 400 can access the memory 412 immediately. It is possible, however, in a multi-master environment that the microprocessor 400 may have to wait longer than is specified above to access the memory 412, thus adding further delay to the process. Moreover, if multiple pieces of data are required to be shifted between the IU register file 409 and the FPU register file 411, the problem of delay is exacerbated.

This problem is particularly evident when the microprocessor 400 is processing data for presentation on a display device, such as that shown in FIG. 1. For example, if a display device has a screen resolution of 1024×768 (a common industry standard), that is, 1024 pixels for each line displayed, and 768 lines of display, processing of data must occur for 786,432 pixels. And, if the refresh rate (the rate at which an entire screen of data is changed) is approximately 70 hz, a microprocessor is required to perform calculations for the 786,432 pixels 70 times per second. A portion of each calculation will now be illustrated by reference to FIG. 5.

Figure 5:
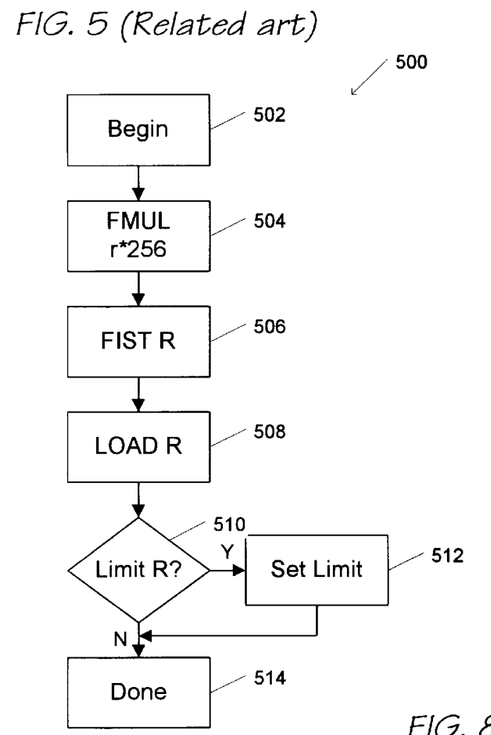
FIG. 5 is a flow chart illustrating a related art process for determining a graphics point from a floating point number.

In FIG. 5, a flow chart 500 is provided to illustrate processing steps required for each pixel (or graphics point) to be displayed. Processing begins at block 502 and proceeds to block 504.

At block 504, a first value "r" is provided for processing. The quantity r is a floating point number whose value is between 0 and 1. It corresponds to the red intensity of a graphics point on a Red, Green, Blue (RGB) display. One skilled in the art will appreciate that the steps presented in flow chart 500 must also be duplicated for green and blue components for each graphics point to be displayed. The floating point number r is multiplied within a floating point unit of a microprocessor by 256, a scaling quantity, to ultimately obtain an integer value R between 0 and 255. The result of three calculations are three 8-bit quantities, thereby providing a 24-bit color depth for each graphic point or pixel. Flow then proceeds to block 506.

At block 506, the result of the floating point multiply, R, is converted into an integer value, typically a 16-bit integer, and is stored to external memory. The method used for conversion of the floating point number R to an integer may be through the use of a FIST instruction, as described above. Flow then proceeds to block 508.

At block 508, the integer R stored in external memory is retrieved and loaded into a register within an integer unit of the microprocessor. Flow then proceeds to decision block 510.

At decision block 510, a determination is made as to whether the integer R is less than 0, or greater than 255. That is, has the integer R exceeded its limits for purposes of being displayed. If not, then processing related to the graphics point R is done, and flow proceeds to block 514. Otherwise, flow proceeds to block 512.

At block 512, a limit for P is set. That is, if R is less than 0, R is set to be 0. If R is greater than 255, then R is set to be 255. Flow then proceeds to block 514.

The process illustrated in flow chart 500 is repeated for each RGB component of each graphics point, every time a graphics point is displayed. One skilled in the art will appreciate that requiring each component value to be multiplied, converted into an integer, stored into memory, and later retrieved from memory, is very time consuming for the microprocessor.

Figure 6:
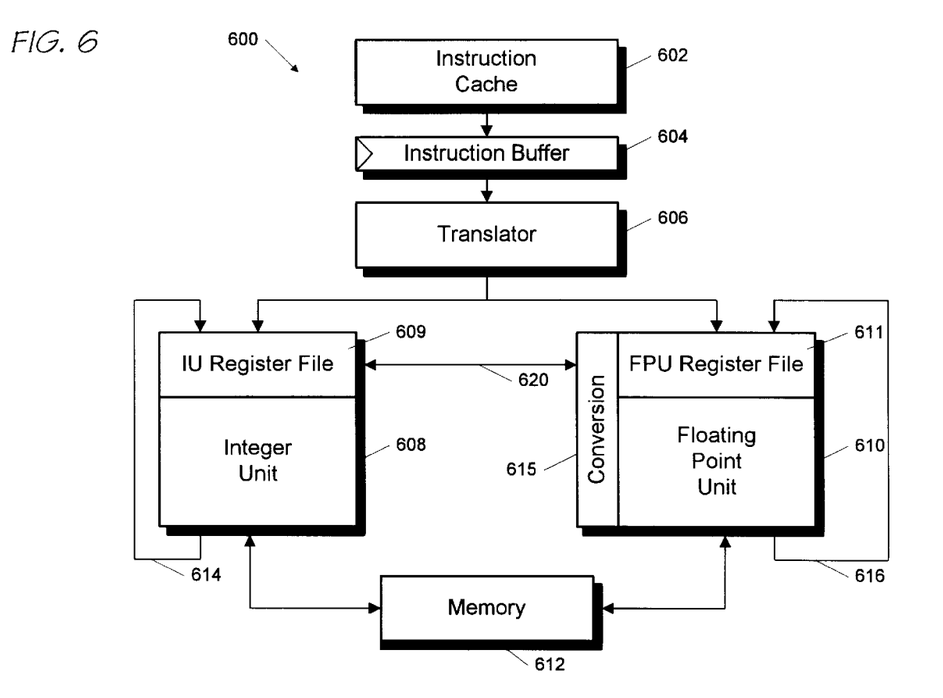
FIG. 6 is a block diagram of a portion of a pipeline microprocessor according to the present invention for performing a convert/multiply operation on a floating point number.

Attention is now directed at FIG. 6, where a portion of a pipeline microprocessor 600 is shown. The microprocessor 600 is similar to that described above with reference to FIG. 4, with like elements having like numbers, the hundreds digit replaced with a 6. Specifically, what is shown are an integer register file 609 and a floating point register file 611. The integer register file 609 contains a plurality of 32-bit registers for storing either 16 or 32-bit integers. The floating point register file 611 contains a plurality of 80-bit registers for storing floating point data in extended precision format. In addition, the floating point register file 611 is configured to allow 16, 32 or 64 bit integers to be stored therein. In one embodiment, the 16, 32 or 64 bit integers are stored into bits 0–63, typically associated with the significand. With the floating point register 611 configured to store integer values, the floating point register 611 can be used as intermediate storage of data between the integer register file 609 and the floating point register 611, without requiring data to external memory. Transfer between the integer register file 609 and the floating point register file 611 is accomplished using a bus 620. One skilled in the art will appreciate that the bus 620 is illustrative only. In a pipeline microprocessor, both the integer register file 609 and the floating point register file 611 have multiple read/write ports that are accessed during a register stage and/or a write back stage.

Also located within the register file 611 is conversion logic 615. The purpose of the conversion logic 615 is to convert data within the floating point register file 611 into a desired format. The conversion logic 615 can convert extended precision floating point data into 16, 32 or 64 bit integer data, or vice versa. Specifics on how the conversion logic 615 operates within the microprocessor 600 is described in detail in the parent case U.S. patent application Ser. No. 08/980481, filed Nov. 29, 1997, now abandoned, entitled "INSTRUCTION SET FOR BIDIRECTIONAL CONVERSION AND TRANSFER OF INTEGER AND FLOATING POINT DATA," which is hereby incorporated by reference.

Figure 7:
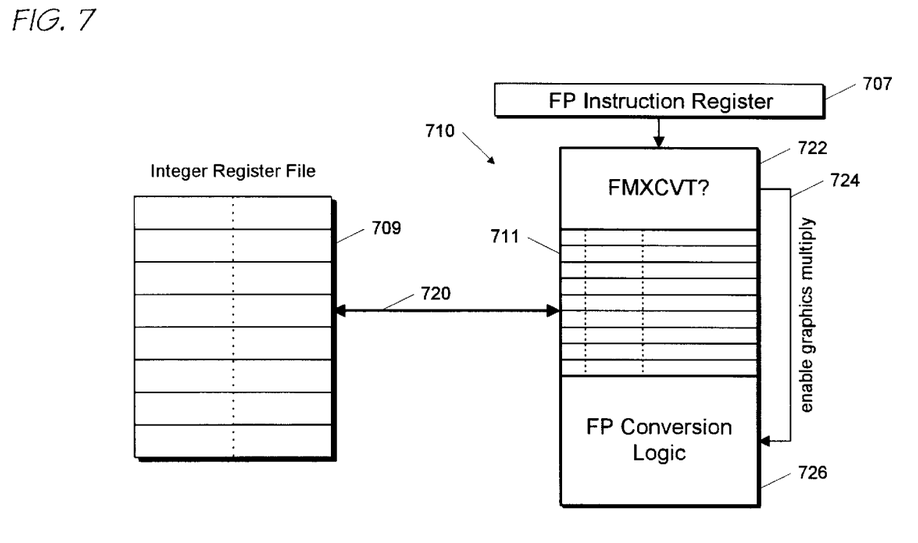
FIG. 7 is a block diagram of a floating point unit according to the present invention, coupled to an integer register file.

Referring now to FIG. 7, a portion of a floating point unit 710, according to the present invention, is shown. The floating point unit 710 is coupled to a floating point instruction register 707 and an integer register file 709. The floating point instruction register 707 provides floating point micro instructions, either from a translator or a control ROM (not shown) for execution by the floating point unit 710. Bi-directional transfer of integers between the floating point register unit 710 and the integer register file 709 is performed via bus 720.

The floating point unit 710 includes a floating point register file 711, for storing either integers or floating point numbers, floating point multiply/convert detection (FMXCVT) logic 722, an enable graphics multiply signal bus 724, and floating point conversion logic 726. Operation of the floating point unit 710 will now be illustrated by performing a floating point multiply, similar to that described above with reference to FIG. 5, in combination with a floating point to integer conversion. The step sequence is shown in FIG. 8 to which attention is now directed.

Figure 8:
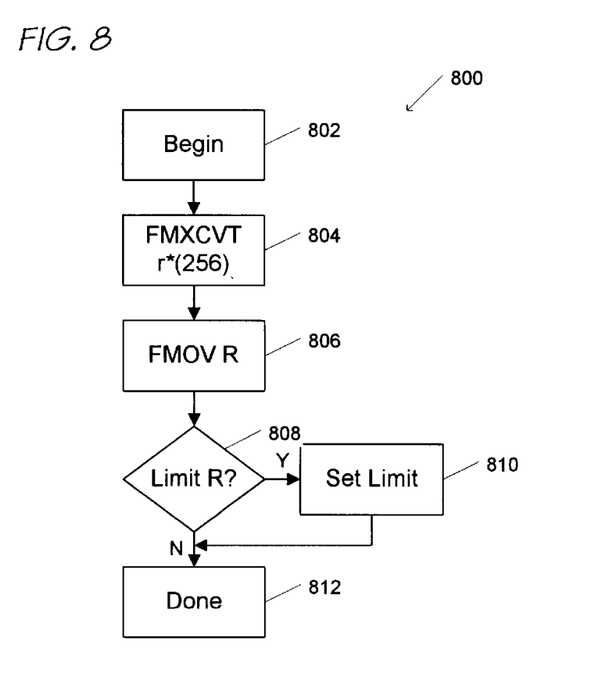
FIG. 8 is a flow chart illustrating a process according to the present invention for determining a graphics point from a floating point number.

In FIG. 8, a flow chart 800 is shown for providing an integer R to an integer register file, corresponding to a graphics point to be displayed. The process begins at block 802 and proceeds to block 804.

At block 804, a floating point instruction, FMXCVT, is provided from the floating point instruction register 707 to the floating point unit 710. The FMXCVT instruction is a special instruction provided by the present invention, that allows a programmer to specify a particular type of floating point conversion operation to be executed by the floating point conversion logic 726. More specifically, if the FMXCVT instruction is detected, rather than converting a specified floating point number into an integer, and storing that integer into the floating point register file 711, as described in the parent patent application (IDT:1395) referenced above, the FMXCVT instruction also instructs the floating point conversion logic, via signal 724, to first multiply the specified floating point number by a graphics constant prior to the conversion. In one embodiment, this graphics constant is 256, but others are possible. The multiply of the graphics constant against the specified floating point number, and conversion of the product into an integer can be combined into a single operation, with little additional hardware, as follows.

When converting a floating point number into an integer, at least two steps are required. The first step involves removing the bias constant from the exponent to determine how many times the significand is to be shifted, and the second step involves actual shifting of the significand to properly align the result according to integer specifications. This is well known in the art.

So, if a floating point number is to be converted into a 16-bit integer, for example, the exponent field of the floating point number is read, and a bias constant is subtracted therefrom. Recall that for x86 microprocessors, a bias of 3FFF is added to every floating point number to allow both positive and negative exponents to be stored within a 15-bit field. For example, if $2^2$ were stored as a floating point number, the number would actually be stored as 10b (left shifted 62 bits), with an exponent of 2+3FFF. Therefore, when converting a floating point number into a 16-bit integer, a bias constant of 3FFFh+63d is subtracted from the value in the exponent field. The result of the subtraction is then used to right shift the value in the significand.

When the FMXCVT logic 722 determines that an FMXCVT instruction is executing, a signal is provided to the floating point conversion logic 726 indicating the fact. The floating point conversion logic, in response to the signal, makes an adjustment to the bias constant before performing the conversion, as follows. Given a floating point number r, with an exponent value of e, to multiply r by 256, the multiplication can be performed by adding 8 to e. That is $r^e*256=r^{(e+8)}$. Using this fact, to multiply a floating point number r by 256, and then convert the product R to an integer, our invention adjusts the bias constant to 3FFFh+63d−8d, and then subtracts this adjusted bias constant from the exponent before shifting the significand. The result is a 16-bit integer whose floating point equivalent was multiplied by 256 prior to conversion. However, no multiply operation was actually required prior to performing the integer conversion. Upon completion of the multiply/convert operation, the integer R is stored back into the floating point register file 711. Flow then proceeds to block 806.

At block 806, the integer R is moved from the floating point register file 711 to the integer register file 709. Flow then proceeds to decision block 808.

At decision block 808, a determination is made as to whether the integer R is within the limits of 0–255. If so, then processing completes at block 812. Otherwise, flow proceeds to block 810.

At block 810, limits to R are set as described above in FIG. 5. Flow then proceeds to block 812.

It should be appreciated that using the conversion logic 726 in conjunction with the floating point register file 711 and the bus 720 has eliminated the need to move integers to memory after conversion from floating point numbers. In addition, by providing a specialized form of a convert instruction, FMXCVT, to particularly identify that a floating point multiply by a graphics constant is desired, during conversion of a floating point number to an integer the multiply operation can be performed in conjunction with the conversion without requiring additional steps for the multiply, without adding significant hardware to the microprocessor, and without storing the resultant integer to memory. And, by making an adjustment to the bias constant prior to it being subtracted from the exponent field, the multiply/convert is accomplished without requiring a full floating point multiply.

Although the present invention and its objects, features, and advantages have been described in detail, other embodiments are encompassed by the invention. For example, the multiply/convert operation has been described with reference to multiplying a specified floating point number by a fixed constant of 256. This is applicable for existing technology, but future display processing may require an alternative multiplier. It is not the value of the multiplier that is significant. It is the adjustment to the bias constant, as part of a convert operation, to perform a multiply/convert within a single operation that is considered significant. This is true whether the application is within the context of processing graphical data, or within another context where data must be processed both by a floating point unit and an integer unit.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A microprocessor for calculating Red, Green and Blue (RGB) graphic points for display, the microprocessor comprising:

a floating point unit, for receiving a floating point number to be multiplied by a graphics constant, and converted into a graphics integer, said floating point number comprising an exponent and a significand; and a floating point convert/multiply instruction, to be executed by said floating point unit, said floating point convert/multiply instruction instructing said floating point unit to adjust a bias constant, associated with converting said floating point number to said graphics integer, prior to said conversion of said floating point number, said bias constant adjusted according to said graphics constant;

wherein by adjusting said bias constant according to said graphics constant prior to conversion of said floating point number to said graphics integer, an RGB graphics point is provided by the microprocessor without requiring a separate floating point multiply.

2. The microprocessor as recited in claim 1 wherein said floating point number comprises a red, green or blue floating point value between 0 and 1.

3. The microprocessor as recited in claim 2 wherein said floating point value is multiplied by said graphics constant to obtain one of the RGB graphics points for display.

4. The microprocessor as recited in claim 1 wherein said graphics constant equals 256.

5. The microprocessor as recited in claim 1 wherein said graphics integer is a 16-bit integer.

6. The microprocessor as recited in claim 5 wherein said 16-bit graphics integer is between 0 and 255.

7. The microprocessor as recited in claim 1 wherein said bias constant, typically used in converting said floating point number to said integer is 3FFF (the bias)+K, where K is a shift value corresponding to the number of digits required to properly align said significand.

8. The microprocessor as recited in claim 7 wherein K aligns said significand for 16-bit, 32-bit or 64-bit integers.

9. The microprocessor as recited in claim 7 wherein said bias constant is 3FFF+63.

10. The microprocessor as recited in claim 9 wherein said bias constant is subtracted from said exponent to determine an amount in which to right shift said significand.

11. The microprocessor as recited in claim 10 wherein when said floating point convert/multiply instruction is executing, said bias constant is adjusted by subtracting 8 from said bias constant prior to subtraction from said exponent.

12. The microprocessor as recited in claim 11 wherein by subtracting 8 from said bias constant, said floating point number is multiplied by 256 as a by product of converting said floating point number to said graphics integer.

13. The microprocessor as recited in claim 1 wherein said graphics integer, after conversion, is stored back into said floating point unit.

14. The microprocessor as recited in claim 11 further comprising:

an integer unit, coupled to said floating point unit, for receiving said graphics integer, converted from said floating point number, and for providing said graphics integer to the microprocessor as one of the graphic points.

15. A floating point unit within a microprocessor, for receiving a convert/multiply instruction that multiplies a floating point number by a graphics constant, and converts a result into a graphics integer, both within a single operation, the floating point unit comprising:

a floating point register file, for storing the floating point number, the floating point number having an exponent and a significand;

convert/multiply detection logic, coupled to said floating point register file, for determining whether a convert to integer instruction is of a type requiring an adjustment to a bias constant; and floating point conversion logic, coupled to both of said floating point register file and said convert/multiply detection logic, for subtracting said bias constant from said exponent before shifting said significand during execution of said convert to integer instruction, and for subtracting a graphics constant from said bias constant, prior to subtraction from said exponent if said convert/multiply detection logic determines that said convert to integer instruction is of a type requiring adjustment.

16. The floating point unit as recited in claim 15 wherein the graphics constant is 256.

17. The floating point unit as recited in claim 15 wherein the graphics integer is a 16-bit integer used as an RGB graphics point.

18. The floating point unit as recited in claim 15 wherein the floating point register file is a register stack for storing a plurality of extended precision floating point numbers.

19. The floating point unit as recited in claim 18 wherein each of said plurality of floating point numbers comprises 1 sign bit, a 15-bit exponent and a 64-bit significand.

20. The floating point unit as recited in claim 15 wherein said exponent within the floating point number is stored within said floating point register file with a bias to allow negative exponents to be stored.

21. The floating point unit as recited in claim 20 wherein said bias is 3FFF.

22. The floating point unit as recited in claim 15 wherein the bias constant is 3FFF+63.

23. The floating point unit as recited in claim 22 wherein if said convert/multiply detection logic determines that a convert/multiply instruction is executing, said bias constant is adjusted to equal 3FFF+63−8.

24. The floating point unit as recited in claim 23 wherein adjusting said bias constant by subtracting 8 is equivalent to multiplying a converted floating point number by 256.

25. The floating point unit as recited in claim 15 wherein if said convert/multiply detection logic determines that said convert to integer instruction is of a type requiring an adjustment, the floating point number is converted into the graphics integer, and is stored as an integer into said floating point register file.

26. A method for performing a graphics multiply on a floating point number, and for converting the floating point number into a graphics integer, the floating point number having an exponent field and a significand field, the method comprising:

a) detecting whether a floating point to integer conversion instruction is executing;

b) within a), detecting whether the conversion instruction specifies an adjustment to a bias constant;

c) if a floating point to integer conversion instruction specifies an adjustment to a bias constant, adjusting the bias constant prior to subtracting the adjusted bias constant from the exponent field of the floating point number; and     d) shifting the significand of the floating point number according to the result of the exponent subtraction.

27. The method for performing a graphics multiply, as recited in claim 26 wherein the bias constant is a predetermined value by which the exponent field of the floating point number is "biased" to allow negative exponents to be represented within the exponent field.

28. The method for performing a graphics multiply, as recited in claim 27 wherein the bias constant comprises a bias of 3FFF and an alignment constant of 63.

29. The method for performing a graphics multiply, as recited in claim 26 wherein if a floating point to integer conversion instruction is executing, the method further comprises subtracting the bias constant (3FFF+63) from the exponent field.

30. The method for performing a graphics multiply, as recited in claim 29 wherein if the conversion instruction specifies an adjustment to the bias constant, the method subtracts 8 from the bias constant before subtracting the adjusted bias constant from the exponent field of the floating point number.

31. The method for performing a graphics multiply, as recited in claim 26 further comprising:

e) storing the shifted significand into a floating point register as the graphics integer, for later transfer to an integer register file.

32. The method for performing a graphics multiply, as recited in claim 31 further comprising:

f) transferring the graphics integer to the integer register file.

* * * * *